United States Patent [19]

Gross

[11] Patent Number: 4,602,593
[45] Date of Patent: Jul. 29, 1986

[54] PET LITTER BOX

[76] Inventor: Richard B. Gross, 304 Tree Lodge Pkwy., Dunwoody, Ga. 30338

[21] Appl. No.: 732,868

[22] Filed: May 10, 1985

[51] Int. Cl.⁴ .................. A01K 29/00; A01K 1/035
[52] U.S. Cl. ........................................ 119/1; 209/374; 209/404
[58] Field of Search .................. 119/1; 209/373, 374, 209/404, 408, 675, 676, 679

[56] References Cited

U.S. PATENT DOCUMENTS

| | | | |
|---|---|---|---|
| 245,617 | 8/1881 | Forbes, Jr. | 209/374 X |
| 3,100,474 | 9/1961 | Schneider | 119/1 |
| 3,194,397 | 7/1965 | Taege | 209/404 X |
| 3,476,083 | 11/1969 | Vander Wall | 119/1 |
| 3,796,188 | 3/1974 | Bradstreet | 119/1 |
| 4,027,625 | 6/1977 | Wheeler | 119/1 |
| 4,217,857 | 8/1980 | Geddie | 119/1 |
| 4,325,325 | 4/1982 | Larter | 119/1 |
| 4,325,822 | 4/1982 | Miller | 119/1 X |

FOREIGN PATENT DOCUMENTS

| | | |
|---|---|---|
| 898086 | 4/1972 | Canada . |
| 3028579 | 2/1982 | Fed. Rep. of Germany . |
| 470214 | 8/1914 | France . |
| 2309138 | 11/1976 | France . |
| 451373 | 9/1949 | Italy . |

Primary Examiner—Robert P. Swiatek
Attorney, Agent, or Firm—Jones & Askew

[57] ABSTRACT

An improved animal sanitary litter box comprising a pair of identical matingly interfitting stackable trays, each of the trays including a slidably movable bottom panel which is movable between a first, closed position for retaining a quantity of litter, and a second, open position. Litter is sifted downwardly from an upper tray to a lower tray, while solid animal excrement is retained on the bottom floor of the upper tray. The excrement can be discarded, the tray cleaned, and then returned to the lower position of the pair of trays. The tray into which the litter was sifted can then be placed atop the now-clean first tray and the litter reused. The size of the openings defined by the movable bottom panel and the floor of the tray is selectively variable for better sifting.

21 Claims, 7 Drawing Figures

PET LITTER BOX

TECHNICAL FIELD

The present invention relates generally to animal sanitation devices, and more particularly relates to an improved self-cleaning pet litter box which allows reuse of sanitary litter.

BACKGROUND

Pet owners are often faced with the unpleasant task of removing and cleaning pet excrement from litter boxes and the like. Constant attention must be devoted to keep litter boxes clean in order to eliminate odor, health problems due to poor sanitary conditions, and avoid soiled carpets or furniture. Efforts to provide conveniently cleanable litter boxes for small animals still leave much to be desired in one respect or another.

It is known that household pets such as cats will refuse to use a sanitary litter box which has been soiled by solid excrement; cats will invariably attempt to "dig" around the soiled area, strewing litter about, or will seek other locales for relief. However, it is also known that urine-soiled sanitary litter which does not contain solid excrement will be reused to a certain degree. Of course, when the litter has become badly urine-soiled, the animal will refuse to use the litter box as well.

It is desirable to exploit this characteristic of limited reusability of sanitary litter to the extent possible for purposes of economy and convenience of the pet owner. For example, U.S. Pat. No. 4,217,857 to Geddie discloses one approach for separating excrement from sanitary litter wherein the solid excrement is removed by lifting a screen pan, sifting the pet litter from the screen pan, and disposing of the solid excrement. In another approach, U.S. Pat. No. 3,100,474 to Schneider, a slidable imperforate plate is removably mounted in the box that contains the litter, and when the plate is removed from the box, the litter falls downwardly onto and through a screening member which permits litter to pass through but which catches the solid excrement. While both of these prior art approaches permit relatively easy separation and collection, both include a separate screen element which requires pouring of the litter from one place to another in preparation for reuse, thereby risking spills and undesirable contact with the soiled litter.

In another approach, illustrated in U.S. Pat. No. 4,325,325, pouring of the litter from place to place is not required, but the entire unit must be inverted and shaken to separate the litter from the excrement. This can be difficult for the elderly or others whose frailty precludes lifting and inversion.

There is accordingly a need for a simple, inexpensive, and easy to manufacture pet litter box which is easy to clean and which permits convenient separation of excrement from litter without requiring pouring of soiled litter from place to place or inversion of the entire litter box.

SUMMARY OF THE INVENTION

The present invention provides an improved animal sanitary litter box comprising a pair of identical matingly interfitting trays. Each of the trays has side walls and a bottom, with the bottom including a plurality of openings defined therein. The upper perimeter of the side walls of the trays matingly interfits with the lower perimeter of the other tray, so that the trays may be stacked one atop the other. Each of the trays includes a slidably movable bottom panel mounted proximate to the bottom floor, also including a plurality of openings. The openings in the slidable bottom panel are positionable adjacent the openings in the bottom floor to sift the litter, but the openings are sized to retain solid animal excrement. Portions of the bottom floor and of the slidably movable bottom panel form a selectively openable bottom for the tray which retains the litter when the slidably movable bottom panel is displaced to an extreme, closed position. Moreover, the slidably movable bottom panel can be variably positioned so that portions of the bottom panel are partially displaced into the openings of the bottom floor to allow sifting of the litter from the top tray to the bottom tray. Advantageously, this permits sifting or separation of variably sized pieces of excrement.

A quantity of fresh litter is placed into the top one of the trays, which is positioned atop a second, empty tray whose selectively openable bottom has been closed. After the litter has been soiled with solid excrement, the litter is sifted from the top tray to the bottom tray by moving a handle attached to the slidably movable bottom panel inwardly and outwardly. Solid excrement remains on portions of the bottom panel and trays, even when the openable bottom is in the widest-open position. The excrement can then be discarded and the tray washed. The now-empty and clean tray can then be used as the bottom tray, and the tray into which the litter was sifted placed atop the now-empty tray. Advantageously, therefore, the litter can be reused.

Accordingly, it is an object of the present invention to provide an improved animal sanitary litter box.

It is another object of the present invention to provide an improved pet litter box which is simple to manufacture and consists of very few parts.

It is another object of the present invention to provide an improved litter box which allows reuse of animal litter without requiring pouring of soiled litter from one location to another, risking spills.

It is another object of the present invention to provide an improved animal sanitary litter box which employs a pair of identical components to form a recycling system.

It is another object of the present invention to provide an improved litter separator or sifter which has variably sized sifter openings that permit more selective sifting and separation.

These and other objects, features, and advantages of the present invention may be more clearly understood and appreciated from a review of the following detailed description of the preferred embodiment and by reference to the appended drawings and claims.

DETAILED DESCRIPTION OF THE PREFERRED EMBODIMENT

Figure 1:
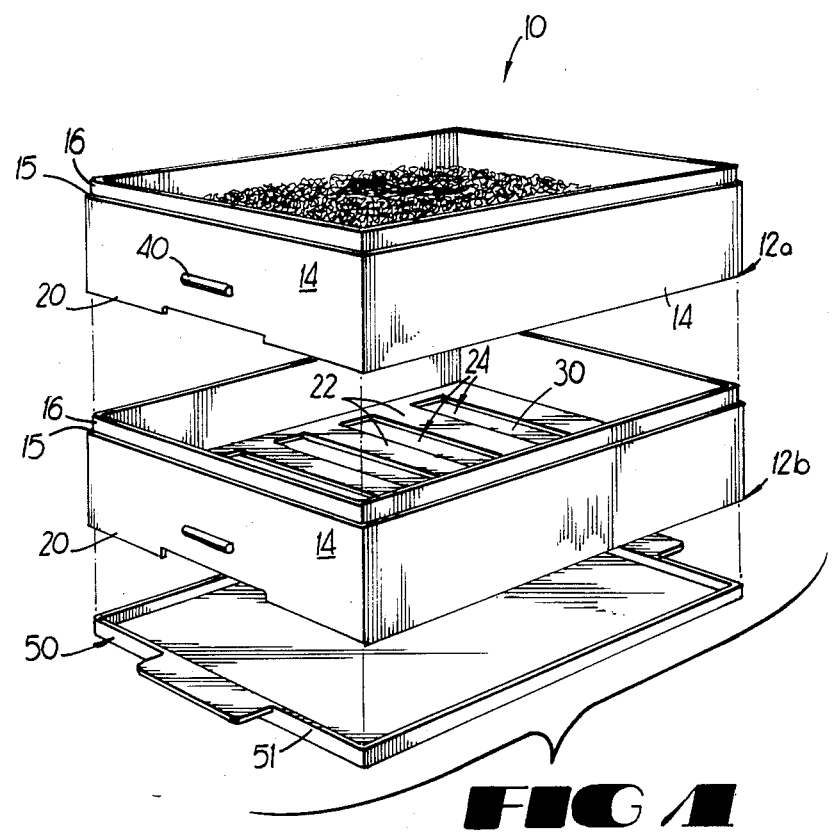
FIG. 1 is a perspective exploded view of the preferred embodiment of the present invention.

Referring now to the drawings, in which like numerals indicate like elements throughout several views, FIG. 1 shows a preferred embodiment of an improved animal sanitary litter box 10 constructed in accordance with the present invention. The litter box 10 in the preferred embodiment comprises a pair of stackable identical tray members 12a, 12b which matingly interfit to stack one atop the other. The tray members each include side walls 14 having an upper perimeter 15 defining an upper flange 16, and a lower perimeter 20 defining a lower flange 21 extending around the tray member.

As best seen in FIG. 3C, the upper flange 16 of a lower tray member 12b matingly interfits with the lower flange 21 perimeter 20 of an upper tray member 12a when the trays are stacked one atop the other to prevent lateral movement or disassembly when stacked.

Figure 2:
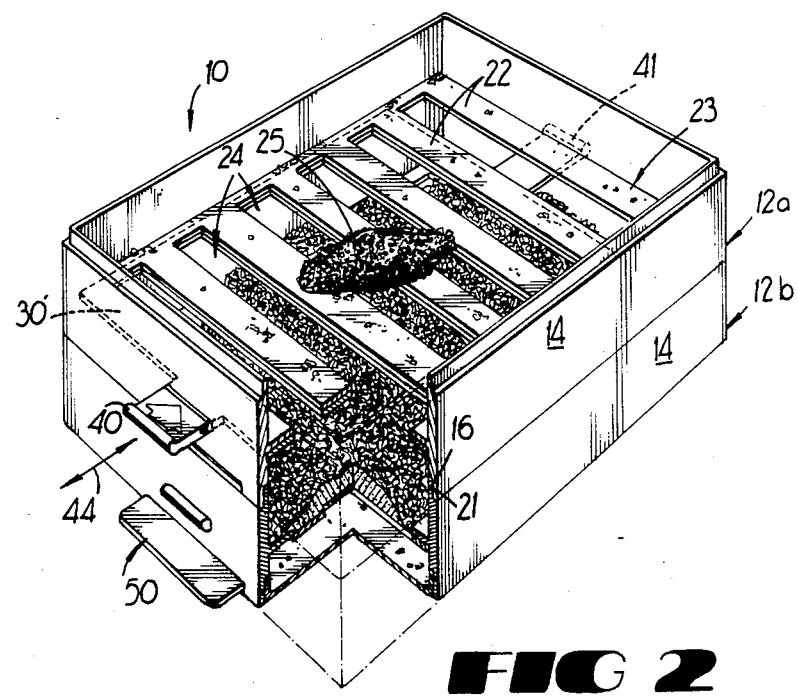
FIG. 2 is a perspective partially cut-away assembled view of the preferred embodiment illustrated in FIG. 1.

As best seen in FIG. 2, the tray members include a plurality of elongate slats 22 defining a bottom floor 23, together with a plurality of elongate rectangular openings 24, the openings 24 being sized to allow litter to fall therethrough but not so large as to pass solid animal excrement 25.

Each of the tray members 12a, 12b further includes a slidably movable bottom panel member 30 mounted proximately adjacent to the bottom floor 23. The bottom panel member 30 also includes a plurality of elongate slats 31, and a plurality of elongate openings 34 sized to allow litter to fall therethrough but not so large as to permit the passage of solid animal excrement. Preferably, the slats 22 and the slats 31 slightly overlap for sealing, as best seen in FIG. 3A.

The bottom panel member 30 includes a pair of oppositely disposed handles 40, 41 which can be used to move the bottom panel member 30 relative to the bottom floor 23 of the pan. Sifting is accomplished by alternately moving the handles in the direction of arrow 44.

In the preferred embodiment, the handles 40, 41 extend through openings or slots 42, 43 defined in the side walls 14. Preferably, the openings 42, 43 are elongate slots slightly smaller than the thickness of the handles 40, 41 for securely mounting the bottom panel member 30 in operative proximity to the bottom floor 23, as best illustrated in FIG. 3C.

The preferred tray member 12a, 12b and moveable bottom panel member 30 are formed of a resilient yet flexible plastic material, so that the handles 40, 41 can be inserted through the slots or openings 42, 43 by bending the panel member 30 to insert the handles through the openings. Once inserted, the resilience of the bottom panel member 30 causes the bottom panel member to return to a flattened configuration for operative engagement with the bottom floor 23.

An optional bottom tray 50, also including a flange 51 for matingly interfitting with the lower perimeter 20 of the tray members, may be provided to catch any loose or finely powdered litter which may find its way through the juncture between the bottom panel member 30 and the bottom floor 23.

As illustrated in FIG. 3A, the improved litter box of the preferred embodiment is used by first disposing the bottom panel member 30 of a top tray 12a such that the openings 24 of the bottom floor 23 are aligned with the slats 31 of the bottom panel member 30, and the openings 34 of the bottom panel member 30 are aligned with slats 22, in a first or "closed" position. In this first position, the litter will be retained on the slats 22 and the slats 31 of bottom panel member 30. A quantity of sanitary litter 60 may then be introduced into the top tray 12a.

The first tray 12a containing a quantity of litter 60 is then placed atop a second, lower tray 12b by interfitting the flange 16 of the lower tray 12b with the flange 21 of the upper tray member 12a, and the box is ready for use.

After the animal such as a cat 65 in FIG. 3A has used the box by depositing solid excrement 25 therein, the steps illustrated in FIGS. 3B and 3C can be taken. The bottom panel member 30 is then displaced to a second or "open" position indicated at 30' in FIG. 2 and FIG. 3C by either pulling the handle 40 or pushing the handle 41 in the direction of arrow 44 (FIG. 2), thereby allowing the litter 60 to fall downwardly through the openings 24, 34 to 60' but retaining the excrement 25 on the aligned slats 22, 31.

Advantageously, and as illustrated in FIG. 3B, the openings 24, 34 can be partially aligned to form a selectively variably sized opening, which permits separation of smaller pieces of excrement such as 26. When the excrement is large as at 25, the sifting process is rapid since the openings 24, 34 when totally aligned permit the litter to fall without repeated sifting action.

At FIG. 3C, the upper one of the trays 12a is then lifted off the lower one of trays 12b, and the excrement discarded. The tray can also at that time be washed before reassembly.

In FIG. 3D, the lower tray 12b is then placed atop the now-empty and clean tray 12a, which then is placed in the bottommost position.

Figure 3E:
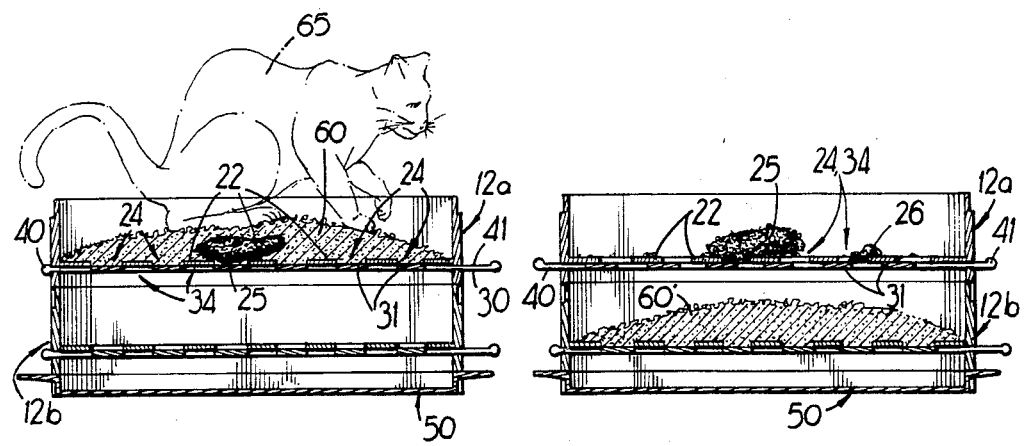
FIG. 3, consisting of FIGS. 3A through 3E, illustrates a sequence wherein an animal uses the top tray in the preferred embodiment of FIG. 1, the litter is sifted to the bottom tray, and the trays are exchanged to reuse the litter.
Figure 3E:
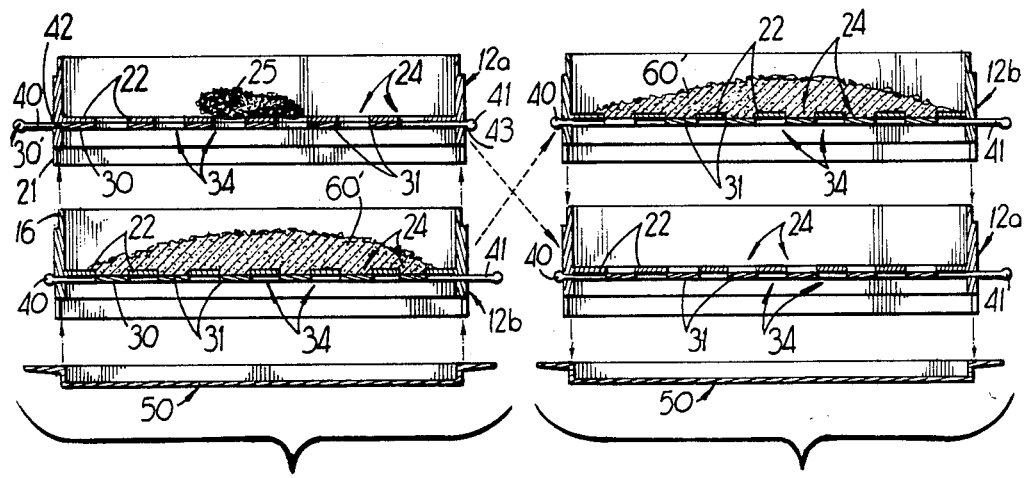
Figure 3E:
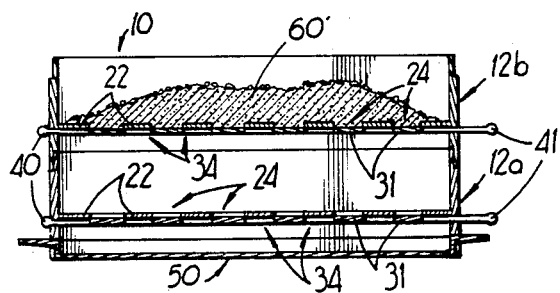

As shown in FIG. 3E, the box is now ready for reuse by the animal.

Advantageously, the entire apparatus is preferably formed of an easily cleanable molded polypropylene plastic material, and only two basic pieces are required for manufacture: the tray member 12, and the bottom panel member 30. A pair of each of these components forms a complete litter recycling system according to the present invention which is simple to construct, easily cleaned, yet is inexpensive to manufacture.

It will also be understood that the preferred embodiment can be constructed employing a more rounded tray configuration, and even a round configuration, and that different sizes, shapes, and positions of the openings 24, 34 and slats 22, 31 can be successfully employed.

In addition, the present invention can be constructed with the slats 31 of the bottom panel member 30 being slightly wider than the width of the openings 24 of the bottom floor 23, and the bottom panel member placed on the interior of the tray, which construction is advantageous in that the downward pressure of the litter and animal tends to press the movable bottom panel member 30 and slats 31 against the non-movable bottom floor 23 and slats 22, providing a better seal against inadvertent leakage of litter downwardly to the lower tray.

Accordingly, it will be understood that the preferred embodiment of the present invention has been disclosed by way of example and that other modifications may occur to those skilled in the art without departing from the scope and the spirit of the appended claims.

I claim:
1. An improved animal sanitary litter box comprising:
a pair of matingly interfitting tray members, each of said tray members including means defining a side wall having an upper perimeter and a lower perimeter and means defining a bottom floor, said bottom floor including a plurality of openings defined therein, said upper perimeter of each of said tray members comprising means for matingly interfitting with said lower perimeter of the other one of said pair of tray members; and a slidably movable bottom panel member mounted proximate to said bottom floor and including a plurality of openings positionable adjacent said openings in said bottom floor, said bottom panel member including portions positionable to portions of said bottom floor to define a bottom surface for said tray members operative to retain sanitary litter introduced therein, whereby when said movable bottom panel member is displaced to position said openings in said movable bottom panel member with said openings in said bottom floor, animal litter falls through said openings but animal droppings larger than said openings are retained on portions of said bottom panel member or of said bottom floor.

2. An improved animal sanitary litter apparatus, comprising:

a tray member for holding a quantity of sanitary litter, said tray member including side walls and a bottom;

a first bottom panel in said tray member, said first bottom panel including a plurality of openings defined therein sized to allow litter to fall through said first bottom panel; and a second bottom panel slidably mounted adjacent said first bottom panel and including a plurality of openings defined therein sized to allow sanitary litter to fall through, said second bottom panel capable of assuming a closed first position wherein said openings in said second bottom panel align with portions of said first bottom panel such that said tray member retains sanitary litter contained therein, and an alternate second position wherein said openings in said second bottom panel align with said openings in said first bottom panel such that sanitary litter contained in said tray member falls through said openings in said first and said second bottom panels but animal droppings larger than said openings are retained on portions of said bottom panel, movement of said second bottom panel between said first position and said second position defining a plurality of selectively variable sized openings for sifting sanitary litter to separate solid excrement.

3. The sanitary litter apparatus of claim 2, further comprising handle means attached to said second bottom panel for moving said second bottom panel between said first and said second positions.

4. The sanitary litter apparatus of claim 3, wherein said handle means extends through an opening defined in said side wall.

5. The sanitary litter apparatus of claim 3, wherein said handle means comprises a pair of handles attached at opposite ends of said second bottom panel and extending through openings defined in opposite portions of said side walls.

6. The sanitary litter apparatus of claim 2, wherein said openings in said first bottom panel comprise:

a plurality of elongate openings separated by portions of said first bottom panel defining elongate slat members affixed to said first bottom panel.

7. The sanitary litter apparatus of claim 2, wherein said openings in said second bottom panel comprise:

a plurality of elongate openings separated by portions of said second bottom panel defining elongate slat members affixed to said second bottom panel.

8. The sanitary litter apparatus of claim 2, wherein said tray member is a first tray member, and further comprising means associated with said first tray member for matingly receiving and retaining a second tray member identical to said first tray member beneath said first tray member.

9. The sanitary litter apparatus of claim 8, wherein said receiving and retaining means comprises:

a flange member perimetrically extending along an upper edge of at least a portion of said side wall; and a flange-receiving recess perimetrically extending along a lower edge of at least a portion of said side wall for receiving a corresponding flange member of said second tray member.

10. The sanitary litter apparatus of claim 2, wherein said tray members and said opening-defining means are formed from a resilient, washable plastic.

11. An improved animal sanitary litter apparatus, comprising:

a pair of tray members for holding a quantity of sanitary litter, each of said tray members including side walls and a first bottom panel, said bottom panel including a plurality of openings defined therein sized to allow litter to fall through said first bottom panel, said side walls of each one of said tray members including means for matingly receiving and retaining the other one of said tray members when one of said tray members is placed atop the other one of said tray members to form a top tray member and a lower tray member;

each of said tray members including a slidably movable second bottom panel slidably mounted adjacent said bottom panel and including a plurality of openings defined therein sized to allow litter to fall through, said second bottom panel capable of assuming a first position wherein said openings in said second bottom panel align with portions of said first bottom panel such that said tray member retains litter contained therein, and an alternate second position wherein said openings in said second bottom panel align with said openings in said first bottom panel such that litter contained in said tray member falls through said openings in said first and said second bottom panels of said top tray member into said lower tray member but animal droppings larger than said openings are retained on portions of said bottom panel of said top tray member.

12. The sanitary litter apparatus of claim 11, further comprising handle means attached to said second bottom panel for moving said second bottom panel between said first and said second positions.

13. The sanitary litter apparatus of claim 12, wherein said handle means extends through an opening defined in said side wall.

14. The sanitary litter apparatus of claim 12, wherein said handle means comprises a pair of handles attached at opposite ends of said second bottom panel and extending through openings defined in opposite portions of said side walls.

15. The sanitary litter apparatus of claim 11, further comprising a third tray member for positioning beneath said lower tray member, said third tray member including means for matingly receiving and retaining said lower tray member.

16. The sanitary litter apparatus of claim 11, wherein said receiving and retaining means comprises:
   a flange member perimetrically extending along an upper edge of at least a portion of said side wall, and,
   a flange-receiving recess perimetrically extending along a lower edge of at least a portion of said side wall for receiving a corresponding flange member of another, lower tray member.

17. The sanitary litter apparatus of claim 11, wherein said openings in said first bottom panel comprise:
   a plurality of elongate openings separated by portions of said first bottom panel defining elongate slat members affixed to said first bottom panel.

18. The sanitary litter apparatus of claim 11, wherein said openings in said second bottom panel comprise:
   a plurality of elongate openings separated by portions of said second bottom panel defining elongate slat members affixed to said second bottom panel.

19. The sanitary litter apparatus of claim 11, wherein said openings in said first bottom panel and said openings in said second bottom panel define a plurality of selectively variably sized openings for sifting litter to separate solid excrement.

20. An improved animal sanitary litter apparatus, comprising:
   a tray member for holding a quantity of sanitary litter, said tray member including side walls and a bottom;
   a first bottom panel in said tray member, said first bottom panel including a plurality of openings defined therein sized to allow litter to fall through said first bottom panel, said openings in said first bottom panel comprising a plurality of elongate openings separated by portions of said first bottom panel defining elongate slat members affixed to said first bottom panel; and
   a second bottom panel slidably mounted adjacent said first bottom panel and including a plurality of openings defined therein sized to allow sanitary litter to fall through,
   said second bottom panel capable of assuming a first position wherein said openings in said second bottom panel align with portions of said first bottom panel such that said tray member retains sanitary litter contained therein, and an alternate second position wherein said opening in said second bottom panel align with said openings in said first bottom panel such that sanitary litter contained in said tray member falls through said openings in said first and said second bottom panels but animal droppings larger than said openings are retained on portions of said bottom panel.

21. An improved animal sanitary litter apparatus, comprising:
   a tray member for holding a quantity of sanitary litter, said tray member including side walls and a bottom;
   a first bottom panel in said tray member, said first bottom panel including a plurality of openings defined therein sized to allow litter to fall through said first bottom panel; and
   a second bottom panel slidably mounted adjacent said first bottom panel and including a plurality of openings defined therein sized to allow sanitary litter to fall through,
   said openings in said second bottom panel comprising a plurality of elongate openings separated by portions of said second bottom panel defining elongate slat members affixed to said second bottom panel,
   said second bottom panel capable of assuming a first position wherein said openings in said second bottom panel align with portions of said first bottom panel such that said tray member retains sanitary litter contained therein, and an alternate second position wherein said openings in said second bottom panel align with said openings in said first bottom panel such that sanitary litter contained in said tray member falls through said openings in said first and said second bottom panels but animal droppings larger than said openings are retained on portions of said bottom panel.

* * * * *